United States Patent
Jayaraj et al.

(10) Patent No.: US 9,232,143 B2
(45) Date of Patent: Jan. 5, 2016

(54) METHOD AND SYSTEM FOR ASSISTIVE PHOTOGRAPHY

(71) Applicants: Ragupathy Jayaraj, Sathankulam (IN); Mukesh Manjunath Prabhu, Mangalore (IN)

(72) Inventors: Ragupathy Jayaraj, Sathankulam (IN); Mukesh Manjunath Prabhu, Mangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/068,516

(22) Filed: Oct. 31, 2013

(65) Prior Publication Data

US 2015/0077574 A1 Mar. 19, 2015

(30) Foreign Application Priority Data

Sep. 18, 2013 (IN) ............................ 4209/CHE/2013

(51) Int. Cl.
*H04N 5/232* (2006.01)

(52) U.S. Cl.
CPC ....... *H04N 5/23293* (2013.01); *H04N 5/23222* (2013.01)

(58) Field of Classification Search
CPC ............................................... H04N 5/23222
USPC ..................................................... 396/51, 49
See application file for complete search history.

(56) References Cited

U.S. PATENT DOCUMENTS

| | | | |
|---|---|---|---|
| 6,054,990 A | 4/2000 | Tran | |
| 6,606,117 B1 | 8/2003 | Windle | |
| 7,805,066 B2 | 9/2010 | Wexler et al. | |
| 8,332,429 B2 | 12/2012 | Poirier et al. | |
| 2003/0169350 A1 | 9/2003 | Wiezel et al. | |
| 2005/0007468 A1* | 1/2005 | Stavely et al. | 348/239 |
| 2005/0117044 A1* | 6/2005 | Suto | 348/333.12 |
| 2009/0162042 A1* | 6/2009 | Wexler et al. | 396/49 |
| 2010/0157128 A1* | 6/2010 | Choi et al. | 348/333.03 |

FOREIGN PATENT DOCUMENTS

EP 2388702 A2 11/2011

* cited by examiner

*Primary Examiner* — Clayton E Laballe
*Assistant Examiner* — Noam Reisner
(74) *Attorney, Agent, or Firm* — Finnegan, Henderson, Farabow, Garrett & Dunner, L.L.P.

(57) ABSTRACT

The disclosure relates generally to photography techniques, and more specifically to a method and system for assistive photography. In one embodiment, an assistive photography method is disclosed, which comprises: capturing one or more image frames of a subject using a photographic device, selecting dynamically, using one or more processors, an assistive stencil based on the one or more image frames and at least one predefined subject photograph requirement; and providing the dynamically selected assistive stencil in a preview display of the photographic device; wherein the assistive stencil assists in at least partially satisfying the at least one predefined subject photograph requirement.

11 Claims, 8 Drawing Sheets

FIG. 8: Example Computing System

METHOD AND SYSTEM FOR ASSISTIVE PHOTOGRAPHY

PRIORITY CLAIM

This U.S. patent application claims priority under 35 U.S.C. §119 to: India Application No. 4209/CHE/2013, filed Sep. 18, 2013, titled "METHOD AND SYSTEM FOR ASSISTIVE PHOTOGRAPHY." The aforementioned application is incorporated herein by reference in its entirety.

TECHNICAL FIELD

This disclosure relates generally to photography techniques, and more specifically to a method and system for assistive photography.

BACKGROUND

With the increase in quality and popularity of devices having photograph-capturing functionality, such as camera, mobile phones and tablets, photographs are increasingly gaining importance in the processes defined for different purposes. For example, photographs are used for the purpose of situation documentation, subject identification and subject condition assessment. For such uses, the photographs may need to meet certain requirements to qualify for usage. For example, an officer inspecting a building for construction violations with respect to an approved plan or building bye laws of a state may require specific views of the house and surrounding areas to be captured.

Photographs taken using standard photography may not meet the desired requirements. This may be due to the photographer's lack of knowledge of the requirements or due to manual error by the photographer. Further, there is no standardized way to specify and communicate the photography requirements to an end user. There may also be cases where some or all of the requirements are not communicated explicitly but remain as implicit requirements.

SUMMARY

In one embodiment, an assistive photography method is disclosed, comprising: capturing one or more image frames of a subject using a photographic device; selecting dynamically, using one or more processors, an assistive stencil based on the one or more image frames and at least one predefined subject photograph requirement; and providing the dynamically selected assistive stencil in a preview display of the photographic device; wherein the assistive stencil assists in at least partially satisfying the at least one predefined subject photograph requirement.

In one embodiment, a photographic device is disclosed, comprising: a processor; a preview display; and a memory disposed in communication with the processor and storing processor-executable instructions, the instructions comprising instructions to: capture one or more image frames of a subject; and select dynamically, an assistive stencil based on the one or more image frames and at least one predefined subject photograph requirement; wherein the assistive stencil assists in at least partially satisfying the at least one predefined subject photograph requirement; and providing via the preview display the dynamically selected assistive stencil.

It is to be understood that both the foregoing general description and the following detailed description are exemplary and explanatory only and are not restrictive of the invention, as claimed.

DETAILED DESCRIPTION

Now, exemplary embodiments of the present disclosure will be described with reference to the accompanying drawings. Wherever possible, the same reference numbers will be used throughout the drawings to refer to the same or like parts. While exemplary embodiments and features are described herein, modifications, adaptations, and other implementations are possible, without departing from the spirit and scope of the disclosure. Accordingly, the following detailed description does not limit the subject matter. Instead, the proper scope of the subject matter is defined by the appended claims.

Figure 1:
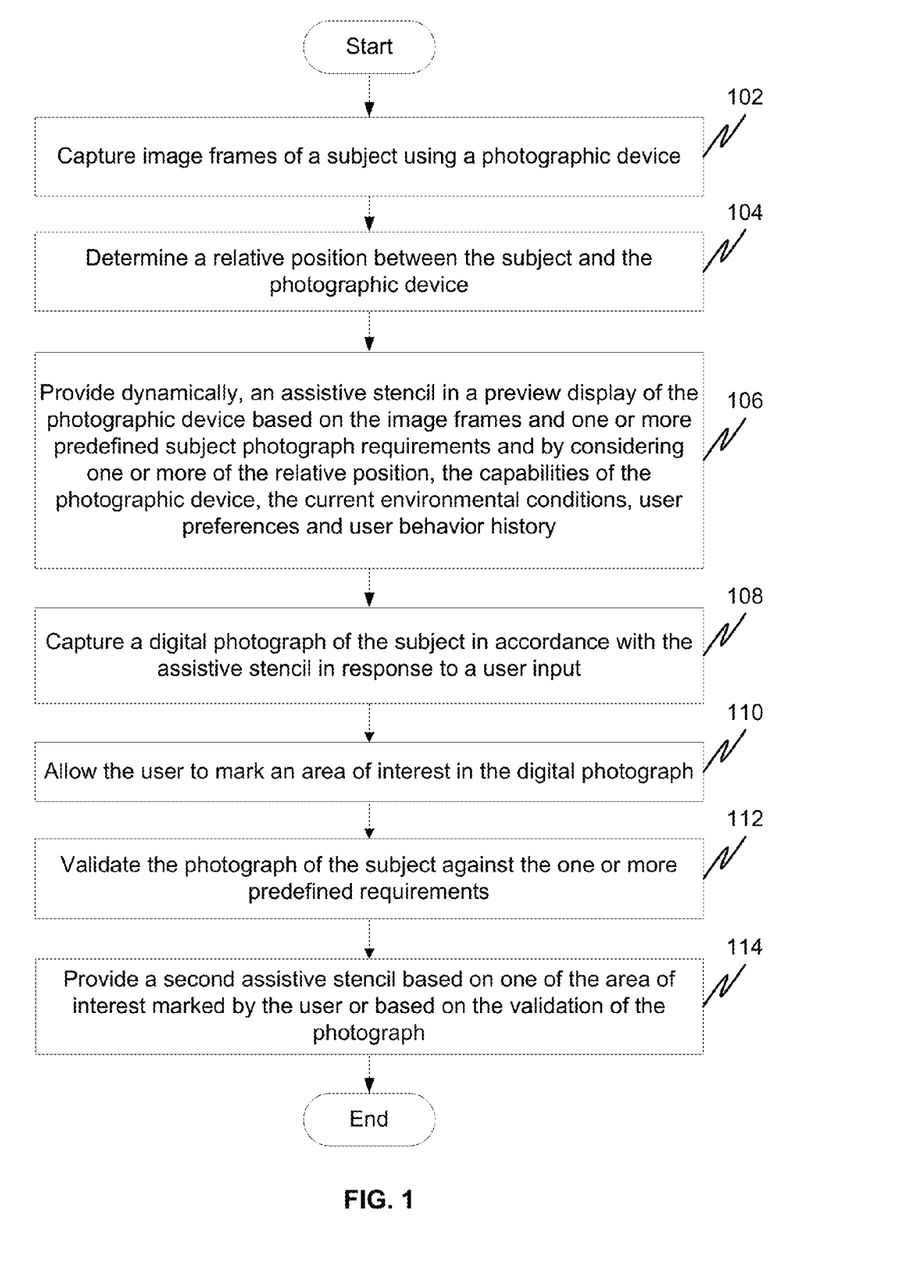
FIG. 1 illustrates a flow chart of a method of assistive photography in accordance with some embodiments.

FIG. 1 illustrates an example assistive photography method in accordance with some embodiments. The method may include capturing image frames of a subject using a photographic device at step 102. Examples of devices that may serve as the photographic device as provided in the description below with reference to FIG. 8. In order to capture the image frames, a camera of the photographic device may be pointed at one or more subjects of interest. In some embodiments, the image frames may correspond to continuous frames of the subject that are received via the camera lens when the camera is pointed at the subject. Thus, capturing the image frames of the subject may, in some embodiments, not require taking a photograph of the subject. Usually, a photograph may represent a point-in-time image of the subject that is saved either on a photographic film or is stored electronically. The images frames as described in conjunction with this disclosure may include a continuous real-time set of frames of the subject. The image frames need not be stored, or may be stored temporarily for a period of time.

The image frames of the subject may be used to automatically determine a relative position between the subject and the photographic device at step 104. In some embodiments, feature based object tracking mechanisms may be used to determine the relative position. In an exemplary embodiment, if the image frames indicate that a complete left profile view of a car has been captured, then the photographic device and possibly the user of the photographic device may be inferred to be to the left of the car and a certain distance away from the car. Similarly, if the image frames indicate that only a partial left profile view is captured, then the position of the photographic device may be inferred to be to the left of the car and at a closer distance to the car. The image frames may be deemed to indicate the complete left profile view of the car or a partial left profile of the car if the image frames match preexisting images corresponding to a complete left profile image of the car or a partial left profile image of the car respectively to a predefined degree. In some embodiments, various images of the car may be preloaded into the photographic device in order to perform the comparison. In some other embodiments, the various images of the car may be available on a server and may be accessible by the photographic device. The subject and/or relative position may be identified in some embodiments manually; a user interface may be provided via a preview display of the photographic device listing a selection of possible subject identifications and relative positions (e.g., car-front; house-east corner; building-rear; etc.), and a user of the photographic device may select a subject identification and relative position from the presented listing.

Thereafter, at step 106, an assistive stencil may be dynamically provided in a preview display of the photographic device based on the image frames and one or more predefined subject photograph requirements. Here, the subject photograph requirements may correspond to certain conditions that have to be satisfied in order for the photograph to be acceptable for a particular purpose. The subject photograph requirements may be predefined by an authorizing authority. For example, a user may have to submit photographs of a vehicle damaged in an accident to an insurance company for claims processing. In order for the photographs to be accepted by the insurance company, the insurance company may specify one or more requirements that are to be met by the photographs. As an example, a requirement specified by the insurance company may be that each of the doors of the car is to be photographed separately. In some embodiments, each requirement specified by the authorizing authority may include a requirement ID, a requirement name, a requirement description, and a requirement priority that classifies whether the requirement is optional or mandatory. An exemplary set of requirements is illustrated below:

| Requirement ID | Requirement name | Requirement description | Requirement priority |
| --- | --- | --- | --- |
| RQ1 | 1st floor | 1st floor of the building has to be covered. View from any side is fine. | Mandatory |
| RQ2 | Adjacent building in Left | 30 ft. beyond the building's boundary in left side of the building has to be photographed | Optional |

In some embodiments, the subject photograph requirements may be defined by the authorizing authority and provided on a server. A user may then download the requirements and save it locally on the photographic device. The subject photograph requirements and the image frames of the subject may be used to identify and select one or more assistive stencils that are to be provided to the user in order to capture photographs that satisfy the requirements. For example, if the image frames indicate that the photographic device is pointed at the front view of a house, assistive stencils may be provided to the user to satisfy requirements, if any, associated with the front view. If more than one requirement is associated with the front view of the house, then more than one stencil may be provided to the user. In some embodiments, a single assistive stencil may be provided to satisfy a requirement. In other embodiments, more than one assistive stencil may be provided one after the other in order to satisfy a requirement. For example, a requirement may specify that the front view of a house is to be captured. However, if the distance in front of the house is not sufficient for the user to go back far enough to photograph the entire front view in accordance with an assistive stencil of the front view, then two stencils may be provided to the user one after the other, one stencil to assist the user to capture a front left perspective view and another stencil to assist the user to capture a front right perspective view. The photographs captured using these two stencils may together satisfy the requirement of capturing the front view of the house. The assistive stencils may be provided to the user until all the requirements have been met. If for example, there are no requirements to be satisfied from the current position of the user with respect to the subject, then the user may be prompted to move to a new position. Similarly, if an assistive stencil is provided to the user and the user is not able to capture an image to conform to the provided stencil, then after a predefined time period, one or more alternate stencils may be provided to the user. Here, the alternate stencils may enable the user to capture photographs that satisfy the requirements associated with the initial stencil.

The one or more assistive stencils may be adaptively and dynamically provided based on the relative position of the user of the photographic device with respect to the subject. The image frames captured when a user points the photographic device at the subject may be analyzed to determine the position of the user and accordingly one or more stencils may be provided. The position of the user relative to the subject may be determined using computer vision methodologies such as feature based object tracking. Thus, two different sets of assistive stencils may be provided to satisfy the same set of requirements if two users attempt to take photographs of a subject from two different positions relative to the subject. Appropriate stencils may be provided based on the user's position to satisfy all the requirements from that position.

In some embodiments, the assistive stencils provided to the user may be selected from a set of stencils saved locally on the photographic device. The set of stencils may be downloaded to the photographic device during configuration of the photographic device or at a later point of time and saved locally. Here, each set of stencils may correspond to a subject or object associated with the user. For example, if the user owns two different cars, then two sets of stencils, each corresponding to one car may be downloaded by the user from a repository. Thereafter, on capturing image frames of the subject, one or more of the locally saved stencils may be provided to assist the user to capture photographs that meet the predefined requirements. In some other embodiments, the one or more assistive stencils may be obtained from a server in real-time. In this case, the image frames captured by the photographic device may be transmitted to a server over a wired or wireless communication link. Thereafter, the image frames may be processed by the server and accordingly one or more assistive stencils may be selected to be provided to the user. These selected stencils may then be communicated to the photographic device over wired or wireless communication links.

In addition to providing the assistive stencils based on the requirements to be met, other parameters such as, but not limited to, the capabilities of the photographic device, the current environmental conditions, the user preferences and the user behavior history may be considered when providing the adaptive stencils. In some embodiments, the capabilities of the photographic device such as, but not limited to, processing capabilities, storage capabilities, type of optical lens used in the photographic device, pixel resolution of the photographic device, etc. may be determined and accordingly assistive stencils may be provided. For example, if the pixel resolution of the photographic device is low, then the assistive stencils provided to the user may be stencils that assist the user to take a photograph from a close distance from the subject. Such stencils which enable the user to take a close up photograph of the subject may minimize noise or distortion in the photograph caused by the low pixel resolution of the photographic device, thus making the photograph acceptable. Further, sensors associated with the photographic device may be used to determine the prevalent light conditions. For example, a light sensor may determine the intensity of light in the proximity of the photographic device at a given point of time. Poor light may require that a photograph is to be taken from a distance close to the subject and hence a different set of stencils may be provided than when light conditions are good. Alternatively, the photographic device may be configured to access a weather server to determine weather conditions for a location. The exact location of the photographic device may be determined by using a Global Position System (GPS) receiver associated with the photographic device.

In some embodiments, one or more preferences of the user may be considered while selecting an assistive stencil to be provided to the user. The user may indicate preferences such as a color of the stencil to be provided and thickness of the outline associated with the stencil. The user may also indicate if the stencil is to be displayed statically at one location in the preview display or if the stencils should dynamically move to conform to the subject. The user preferences may be explicitly specified by the user or may be learned based on user behavior history.

Figure 2A:
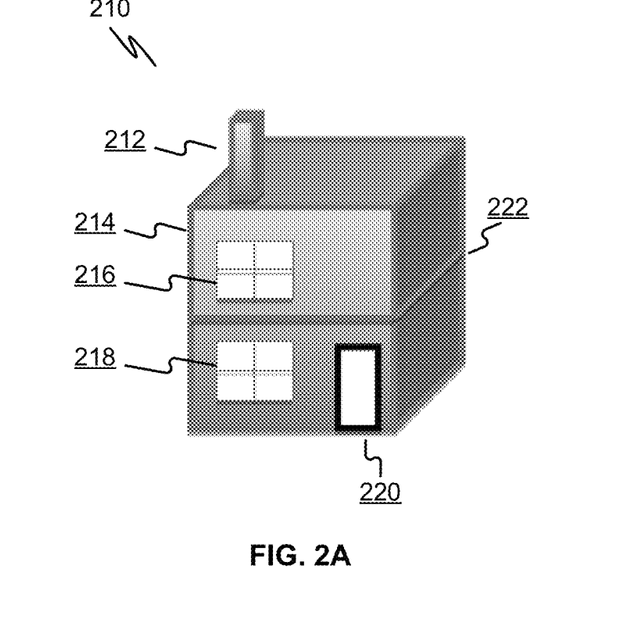
FIG. 2A illustrates an exemplary photograph of a subject in accordance with some embodiments.
Figure 2B:
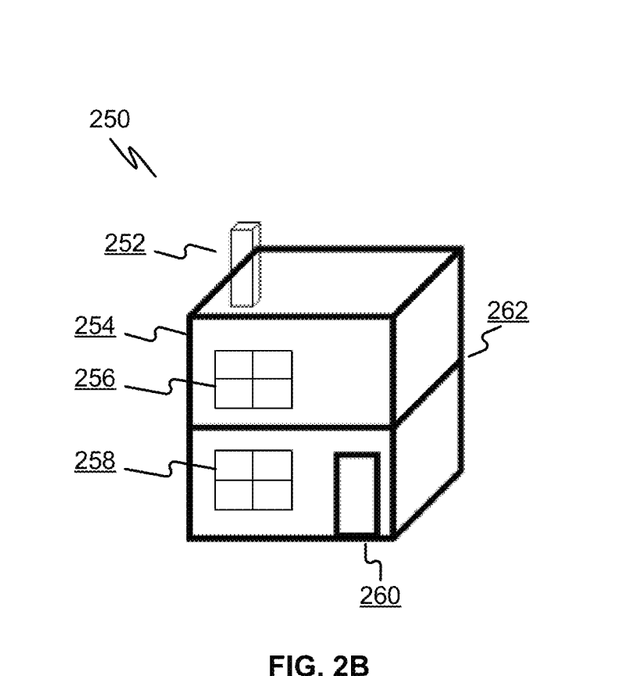
FIG. 2B illustrates an exemplary assistive stencil created from a photograph in accordance with some embodiments.

The assistive stencils provided to the user for a subject may be pre-created based on one or more photographs or images of the subject. For example, if stencils are to be created for a car, the images of the car from various online and offline sources may be used to create the assistive stencils. The assistive stencils may be images having only minimalistic details of the subject tracked as opaque and rest of the surfaces of the subject left transparent. The stencils may be two dimensional stencils or three dimensional stencils. In order to create the assistive stencils for a subject, different views of the subject may be photographed and stencils created for the subject. FIG. 2A and FIG. 2B illustrate an exemplary photograph 210 of a subject and a stencil 250 created from the photograph respectively. For example, the photograph 210 may have exemplary features, such as opaque chimney 212, opaque walls 214, transparent or translucent windows 216 and 218 on different floors of the building that is the subject of the photograph, opaque or transparent or translucent doors 220, and features 222 defining the boundaries or partitions within the subject, or the like. A stencil 250 corresponding to this subject identified in the photograph may have corresponding exemplary features, such as transparent chimney 252, transparent walls 254, transparent windows 256 and 258 on different floors of the building that is the subject of the photograph, opaque doors 260, and edge features 262 defining the boundaries or partitions within the subject, or the like.

Figure 3:
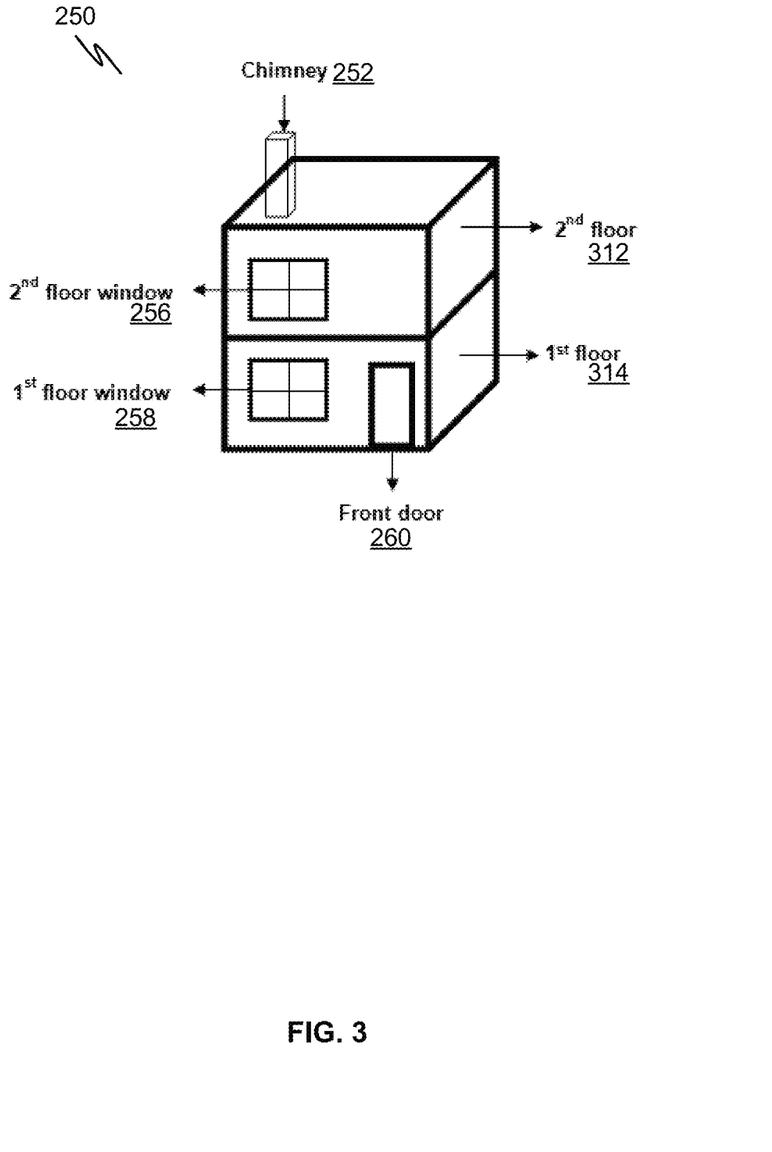
FIG. 3 illustrates an exemplary depiction of configuration of an assistive stencil in accordance with some embodiments.

On creating the stencils, the stencils may be configured by manually marking areas within the stencil to correspond to the areas of the subject as illustrated in FIG. 3. For example, in FIG. 3, the stencil 250 of FIG. 2B may be used, and features of the subject (e.g., chimney 252; second floor window 256; first floor window 258; front door 260; first floor 314; second floor 312; etc.) may be identified and labeled digitally. The information associated with the stencils may be structurally and hierarchically configured and managed as individual stencil parts. Each stencil part may include a stencil part ID, a stencil part name, a stencil part description to identify the stencil part, and reference data corresponding to the stencil part that may be used to compare the subject part in any given image frames with respect to the stencil part. Further, each stencil part may also include information identifying the stencil ID to which the stencil part belongs and also relationship of the stencil part with respect to the stencil. The configuration of the stencil assists in determining which stencils are to be provided for which requirement.

Figure 4A:
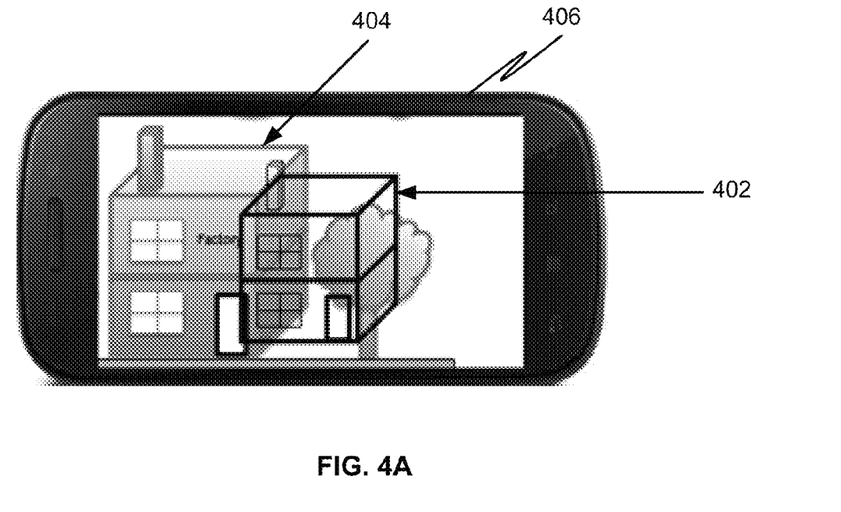
FIG. 4A illustrates an exemplary embodiment wherein an assistive stencil corresponding to a subject is provided on a preview display of a photographic device in accordance with some embodiments of the invention.
Figure 4B:
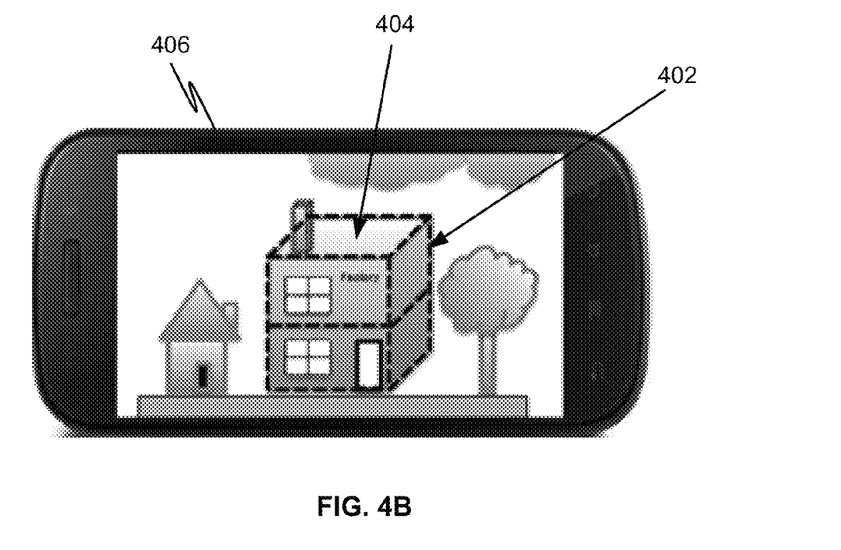
FIG. 4B illustrates an exemplary embodiment depicting alignment of an assistive stencil and a subject in accordance with some embodiments of the invention.

FIG. 4A illustrates an exemplary embodiment wherein an assistive stencil 402 corresponding to a subject 404 is provided to the user on a preview display of a photographic device such as a mobile phone 406. Assistive stencil 402 may be provided based on the position of the user of the photographic device with respect to subject 404 and also based on one or more requirements to be met. The user may align assistive stencil 402 with subject 404 to take a photograph that conforms to one or more requirements as illustrated in FIG. 4B. In some embodiments, the user or the photographic device may be required to move in one or more directions in order to align assistive stencil 402 with the subject 404. In other embodiments, a different stencil may be provided to the user in order to assist the user in taking one or more photographs from the current position of the user. In some other embodiments, the adaptive stencil may dynamically move in one or more directions on the preview display such as to conform to the subject.

Referring back to FIG. 1, after the assistive stencil is provided to the user, the user may align the stencil with the subject and provide an input to capture a digital photograph of the subject at step 108. The input may include, but is not limited to, the user pressing a physical button on the photographic device or interacting with a touch sensitive area of the preview display. When a user provides the input, a point-in-time image of the subject may be captured and saved in a memory of the photographic device. In some embodiments, a digital photograph of the subject may be automatically captured when the stencil is substantially aligned with the subject to be photographed. Once a photograph of the subject is captured, the user may be allowed to mark one or more areas of interest in the digital photograph at step 110. The user may be provided a user interface to mark the one or more areas. In other embodiments, if a display associated with the photographic device is touch sensitive, the user may interact directly with the touch sensitive display in order to mark the one or more areas of interest.

Figure 5:
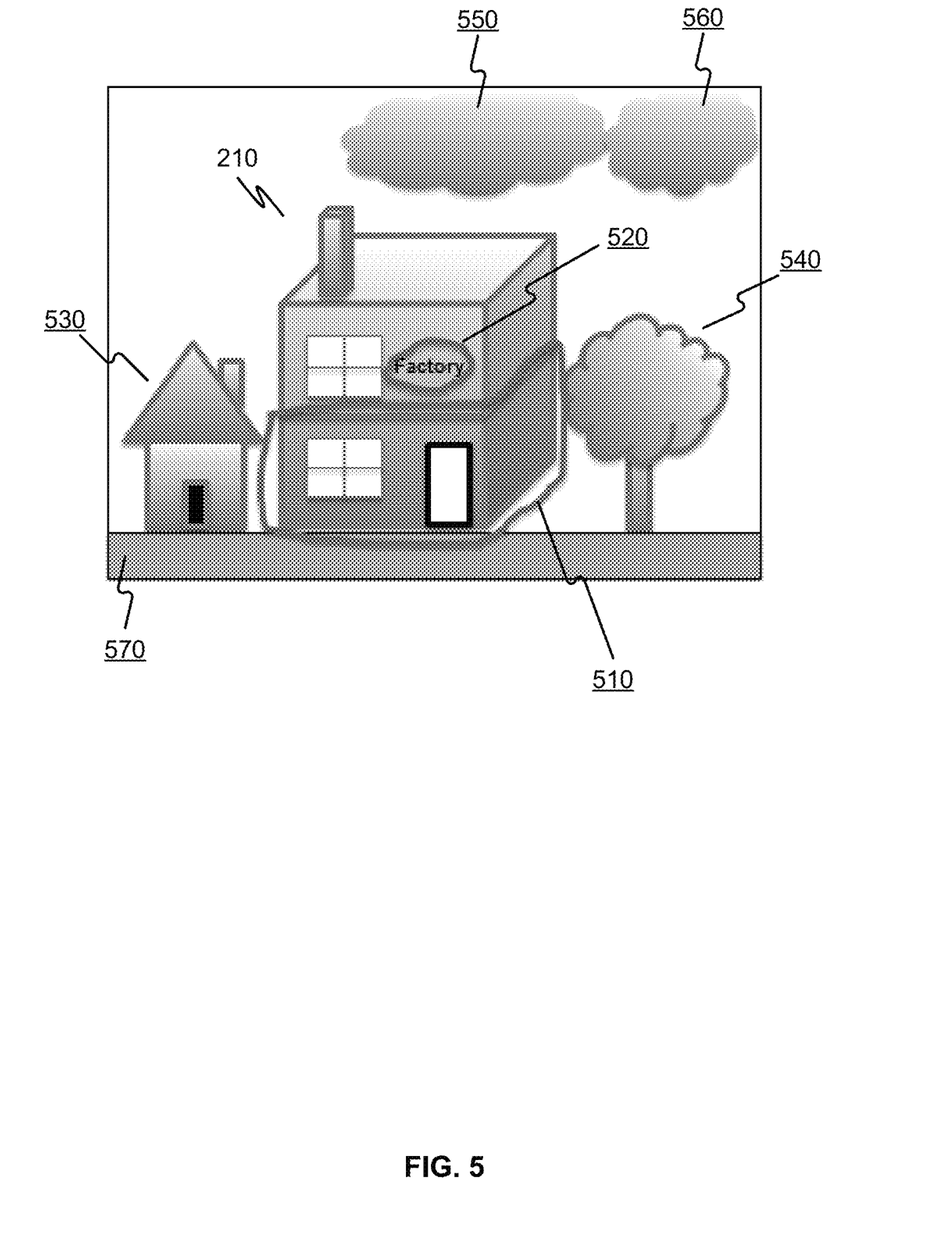
FIG. 5 illustrates an exemplary embodiment depicting marking of a photograph of a subject by the user in accordance with some embodiments.

FIG. 5 illustrates an exemplary photograph having areas of interest marked by the user. In some embodiments, the user may mark areas (e.g., the areas encompassed by marking lines 510, 520) on the digital photograph to add additional information for a requirement or for a purpose. For example, in FIG. 5, the photograph includes the above-mentioned areas of interest, as well as other objects such as second home 530, the ground 570, tree 540, and clouds (550, 560), that may all be excluded from further processing if not identified as an area of interest to the user. Various properties of the marking including color of a marking line 510-520, thickness of the marking line, color of the marking area, pressure applied while marking, etc. may indicate additional information. For example, red color marking could mean that the marked part of the building violates the local construction law. The user may add more detail to describe the meaning of a marking, for example, the user can specify that the particular marking points to the building's name. In some embodiments, only portions of an image including the marked area may be passed to an Optical Character Recognition (OCR) engine to recognize the name of the building rather than passing full images of the building to the OCR engine.

In some other embodiments, the marking of the one or more areas of interest may trigger one or more second assistive stencils to be provided to the user. In other words, marking of an area of interest may trigger further granular stencils associated with the marked area of interest to be provided to the user. For example, if photographs of a damaged car are to be submitted to an insurance company in order to process the claims, the user may mark an area of damage; say a portion of the front passenger door. Now, based on this feedback from the user, one or more assistive stencils corresponding to the front passenger door may be provided to capture more detailed photographs of the damaged area. In some embodiments, the one or more second assistive stencils may be provided from a server. In this case, the photograph taken by the user as well as the markings made by the user is transmitted to the server in order to select and obtain the one or more stencils.

Figure 6A:
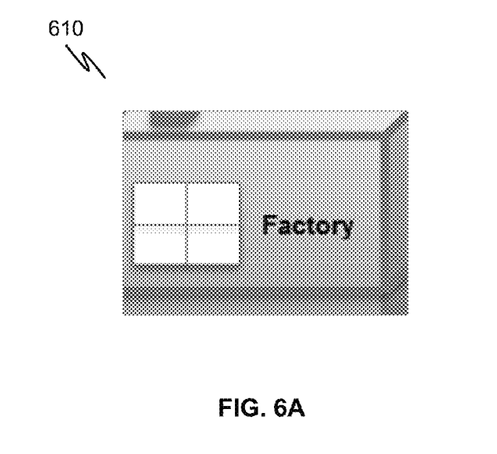
FIG. 6A illustrates an exemplary embodiment of a captured photograph in accordance with some embodiments.
Figure 6B:
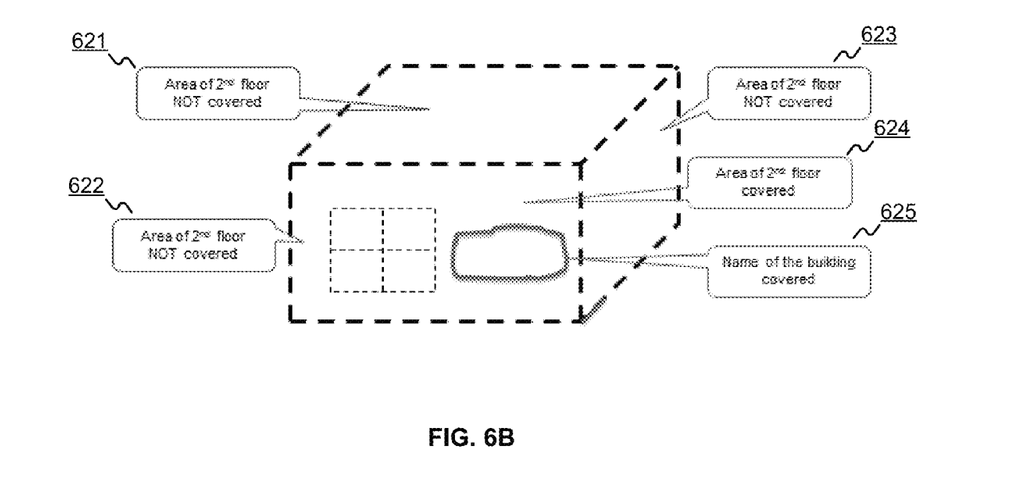
FIG. 6B illustrates various requirements that have either been satisfied or left unsatisfied in the photograph in accordance with some embodiments.

At step 112, the photograph captured based on the provided assistive stencil may be validated against the requirements that the photograph is supposed to meet. In other words, the photograph may be checked to verify if the requirements for that photograph have been satisfied. The photograph may be validated by comparing the photograph against a preexisting photograph corresponding to the stencil that was provided to the user. For example, if a requirement indicates a rear view of a car is to be captured and a corresponding stencil is provided to enable the user to take a photograph of the rear view, then the photograph taken using the stencil may be compared against a preexisting photograph of the rear view of the car in order to validate the photograph that was captured using the stencil. In addition to the requirements that are to be met for the photograph, the photograph may also be checked to determine if any other partial or complete requirements have been inadvertently met in the photograph. Based on the validation of the photograph, one or more second assistive stencils may be provided to the user at step 114. If a photograph meets some requirements but fails to meet some others, then further stencils may be provided to the user that focuses on the requirements that were not met. For example, two requirements for a photograph of a building may include "a front view of the building is to be covered" and "30 feet to the left of the building is to be covered". On validating the photograph, if it is found that the front view requirement is satisfied but the "30 feet to the left of the building is to be covered" requirement is not satisfied, then further stencils may be provided to assist the user to capture a photo that satisfies that requirement. If a photograph inadvertently partially or completely satisfies a requirement that was not meant to be satisfied by that photograph, then additional stencils to capture that satisfied part of the requirement may not be provided to the user. FIG. 6A illustrates an exemplary embodiment of a captured photograph 610 and FIG. 6B illustrates various requirements 621-625 that have either been satisfied or left unsatisfied in the photograph 610. Here, the intended requirement for the photograph may be to capture the name of the building. In addition to the intended requirement, an unintended requirement "2nd floor of the building has to be covered. View from any side is fine" may also have been partially captured as shown in FIGS. 6A (see element 610) and 6B (see elements 624-625). As a result, additional stencils which cover the already captured partial requirement may not need to be provided to the user.

Figure 7:
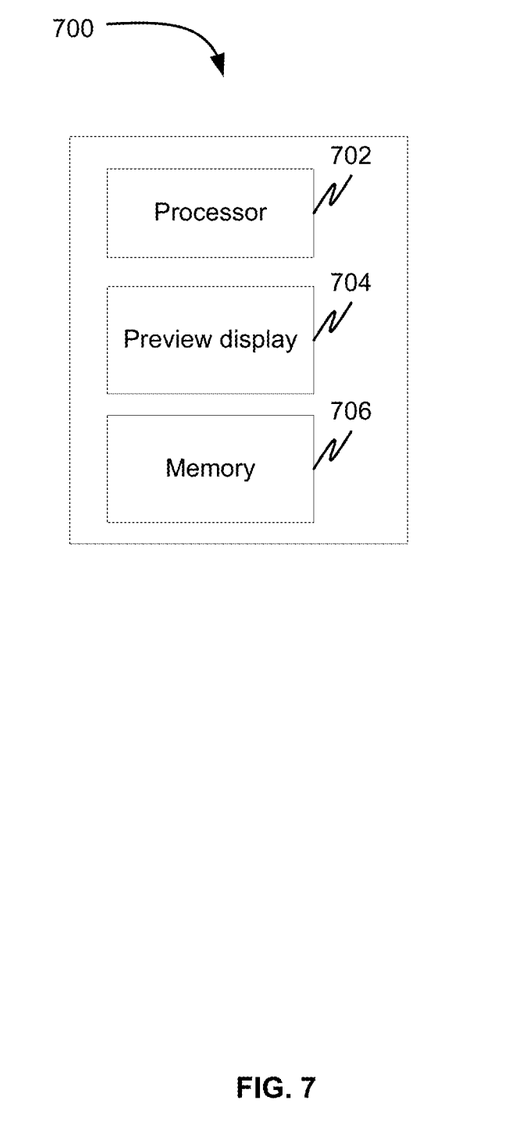
FIG. 7 illustrates a photographic device for assistive photography in accordance with some embodiments.

A photographic device 700 for assisting a user to capture photographs that conform to one or more requirements will now be described in conjunction with FIG. 7. Photographic device 700 may include a processor 702, a preview display 704, and a memory 706 disposed in communication with processor 702 and storing processor-executable instructions. The instructions may comprise instructions to capture one or more image frames of a subject, select dynamically, an assistive stencil based on the one or more image frames and at least one predefined subject photograph requirement and provide via preview display 704 the dynamically selected assistive stencil. Here, the one or more assistive stencils may assist the user to at least partially satisfy the at least one predefined requirement of the photograph of the subject.

In order to capture the image frames, a camera (not shown in FIG. 7) associated with photographic device 700 may be pointed at the subject of interest. In the context of this disclosure, the image frames may correspond to continuous frames of the subject that are received via the camera lens when the camera is pointed at the subject. Thus, capturing the image frames of the subject may not require taking a photograph of the subject. Usually, a photograph represents a point-in-time image of the subject that is saved either on a photographic film or is stored electronically. The images frames as described in conjunction with this disclosure may represent, in some embodiments, a continuous real-time set of frames of the subject. The image frames may not be required to be stored, or may be stored temporarily for a period of time.

Photographic device 700 may further include instructions stored in memory 706 to determine a relative position between the subject and photographic device 700. One or more assistive stencils may then be selected based on the relative position and the one or more subject photograph requirements. Additionally, the capabilities of photographic device 700, the current environmental conditions, the user preferences and the user behavior history may determine which stencils are selected to be presented as explained in conjunction with FIG. 1. Here, the requirements of the photograph may correspond to certain conditions that have to be satisfied in order for the photograph to be acceptable for a particular purpose. The requirements for a photograph may be predefined by an authorizing authority. In some embodiments, the requirements associated with a photograph may be defined by the authorizing authority and provided on a server. A user may then download the requirements and save it locally on the photographic device. The subject photograph requirements and the image frames of the subject may be used to select one or more assistive stencils that are to be provided to the user in order to capture photographs that satisfy the requirements. One or more than one stencil may be selected to be provided to the user in order to satisfy a single requirement as explained in conjunction with FIG. 1. The one or more assistive stencils may be adaptively and dynamically provided based on the relative position of photographic device 700 with respect to the subject. The image frames captured when a user points the photographic device at the subject may be analyzed to determine the position of photographic device 700 and accordingly one or more stencils may be provided.

In some embodiments, the assistive stencils provided to the user may be selected from a set of stencils saved in memory 706 of photographic device 700. The set of stencils may be downloaded to memory 706 from a web server during configuration of the photographic device or at a later point of time and saved locally. In some other embodiments, the one or more assistive stencils may be provided directly from the web server in real-time. In this case, the image frames captured by photographic device 700 may be transmitted to the web server over a wired or wireless communication link. Thereafter, the image frames may be processed by the web server and accordingly one or more assistive stencils may be selected to be provided to the user. These selected stencils may then be communicated to photographic device 700 over the wired or wireless communication link. The assistive stencils provided to the user for a subject may be pre-created based on one or more photographs or images of the subject as explained in conjunction with FIG. 1.

After the assistive stencil is provided to the user, the user may align the stencil with the subject and provide an input such as pressing a physical button (not shown in FIG. 7) on photographic device 700 or interacting with a touch sensitive area of preview display 704. Photographic device 700 may include instructions to capture a digital photograph of the subject in response to the input by the user. When the user provides the input, a point-in-time image of the subject may be captured and saved in memory 706 of photographic device 700. In some embodiments, a digital photograph of the subject may be automatically captured when the stencil is substantially aligned with the subject to be photographed.

Photographic device 700 may further include a user interface (not shown in FIG. 7) to allow the user to mark one or more areas of interest in the digital photograph. In some embodiments, if a display associated with the photographic device is touch sensitive, the user may interact directly with the touch sensitive display in order to mark the one or more areas of interest. In some embodiments, the user may mark areas on the digital photograph to add additional information for a requirement or for a purpose. Various properties of the marking including color of a marking line, thickness of the marking line, color of the marking area, pressure applied while marking, etc. may indicate additional information. In some other embodiments, the marking of the one or more areas of interest may trigger one or more second assistive stencils to be provided to the user. In other words, marking of an area of interest may trigger further granular stencils associated with the marked area of interest to be provided to the user as explained in conjunction with FIG. 1. In some embodiments, the one or more second assistive stencils may be provided from a server. In this case, the photograph taken by the user as well as the markings made by the user is transmitted to the web server in order to select one or more stencils that are to be provided to the user.

In some embodiments, on capturing the digital photograph of the subject in accordance with the assistive stencil, instructions stored in memory 706 may cause the digital photograph to be validated against the requirements that the photograph is supposed to meet. In other words, the digital photograph may be checked to verify if the requirements for that photograph have been satisfied. In addition to the requirements that are to be met for the photograph, the photograph may also be checked to determine if any other partial or complete requirements have been inadvertently met in the photograph. Based on the validation of the photograph, further assistive stencils may be provided to the user. If a photograph meets some requirements but fails to meet some others, then further stencils may be provided to the user that focuses on the requirements that were not met. If a photograph inadvertently partially or completely satisfies a requirement that was not meant to be satisfied by that photograph, then additional stencils to capture that satisfied part of the requirement may not be provided to the user.

Thus, the method and system disclosed herein may enable a user to capture photographs that comply with certain conditions or requirements that make the photograph acceptable for a particular purpose. Since the assistive stencils are provided dynamically and in real time depending on the position of the user, the stencils may assist the user to a greater degree. Further, by adapting the stencils provided based on the image frames seen by the photographic device and also various other device or environmental constraints, the probability of the photographs being rejected for non-compliance with the requirements may be minimized.

Computer System

Figure 8:
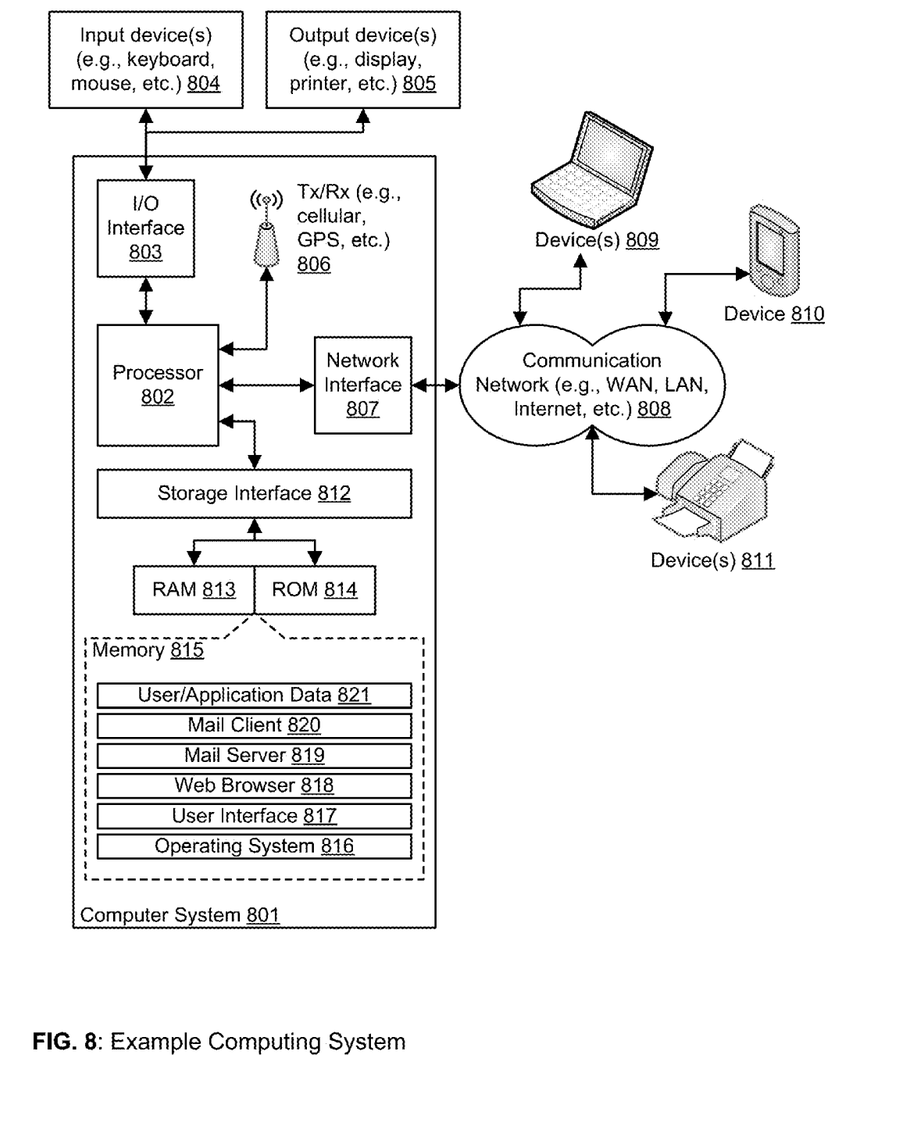
FIG. 8 is a block diagram of an exemplary computer system for implementing embodiments consistent with the present disclosure.

FIG. 8 is a block diagram of an exemplary computer system for implementing embodiments consistent with the present disclosure. Variations of computer system 801 may be used for implementing the photographic device. Computer system 801 may comprise a central processing unit ("CPU" or "processor") 802. Processor 802 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, charge-coupled device (CCD), card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 810, 811, and 812. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and system for assistive photography. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

We claim:

1. An assistive photography method, comprising:
    capturing one or more image frames of a subject using a photographic device;
    selecting dynamically, using one or more processors, an assistive overlay stencil based on the one or more image frames, at least one predefined subject photograph requirement, and a relative position between the subject and the photographic device based on the one or more image frames;
    wherein the assistive overlay stencil assists in at least partially satisfying the at least one predefined subject photograph requirement by overlaying the assistive overlay stencil on at least one of the one or more image frames of the subject so as to conform to the subject, the overlaying being performed by repositioning the photographic device with respect to the subject; and
    providing the dynamically selected assistive overlay stencil in a preview display of the photographic device;
    capturing a digital photograph in accordance with the assistive overlay stencil based on an input from a user or automatically;
    allowing a user to mark an area of interest in the digital photograph; and
    providing a second assistive overlay stencil based on the area of interest marked in the digital photograph.

2. The method of claim 1, wherein the assistive overlay stencil is pre-created based on at least one photograph of the subject to outline the subject.

3. The method of claim 1, wherein the assistive overlay stencil is selected based on at least one of: one or more capabilities of the photographic device, one or more current environmental conditions, one or more user preferences, and user behavior history.

4. The method of claim 1, wherein a position coordinate of the assistive overlay stencil provided in the preview display is based on at least one of: the one or more image frames; and the at least one predefined subject photograph requirement.

5. The method of claim 1, wherein at least one of the assistive overlay stencil and the second assistive overlay stencil is obtained from a server.

6. The method of claim 1, further comprising: validating the digital photograph against the at least one predefined subject photograph requirement.

7. A photographic device comprising:
    a processor;
    a preview display; and
    a memory disposed in communication with the processor and storing processor-executable instructions, the instructions comprising instructions to:
        capture one or more image frames of a subject;
        select dynamically, an assistive overlay stencil based on the one or more image frames and at least one predefined subject photograph requirement, at least one predefined subject photograph requirement, and a relative position between the subject and the photographic device based on the one or more image frames;
        wherein the assistive overlay stencil assists in at least partially satisfying the at least one predefined subject photograph requirement by overlaying the assistive overlay stencil with at least one of the one or more image frames of the subject so as to conform to the subject, the overlaying being performed by repositioning the photographic device with respect to the subject; and
        provide via the preview display the dynamically selected assistive overlay stencil;
        capture a digital photograph in accordance with the assistive overlay stencil based on an input from a user or automatically;
        allow the user to mark an area of interest in the digital photograph; and
        provide a second assistive overlay stencil based on the area of interest marked in the digital photograph.

8. The photographic device of claim 7, the instructions further comprising instructions to: select the assistive overlay stencil based on at least one of: one or more capabilities of the photographic device, one or more current environmental conditions, one or more user preferences, and user behavior history.

9. The photographic device of claim 7, wherein a position of the assistive overlay stencil provided via the preview display is based on at least one of: the one or more image frames, and the at least one predefined subject photograph requirement.

10. The photographic device of claim 7, wherein at least one of the assistive overlay stencil and the second assistive overlay stencil is obtained from a server.

11. The photographic device of claim 7, the instructions further comprising instructions to: validate the digital photograph against the at least one predefined subject photograph requirement.

* * * * *

UNITED STATES PATENT AND TRADEMARK OFFICE
CERTIFICATE OF CORRECTION

PATENT NO.        : 9,232,143 B2
APPLICATION NO.   : 14/068516
DATED             : January 5, 2016
INVENTOR(S)       : Ragupathy Jayaraj et al.

It is certified that error appears in the above-identified patent and that said Letters Patent is hereby corrected as shown below:

Claims

Claim 7, Col. 14, Line 11, "select dynamically," should read as --select dynamically--.

Signed and Sealed this
Twelfth Day of April, 2016

Michelle K. Lee
*Director of the United States Patent and Trademark Office*